United States Patent
Priezzhev et al.

(10) Patent No.: US 10,168,447 B2
(45) Date of Patent: Jan. 1, 2019

(54) AUTOMATIC GEOSTEERING AND EVOLUTIONARY ALGORITHM FOR USE WITH SAME

(71) Applicant: Schlumberger Technology Corporation, Sugar Land, TX (US)

(72) Inventors: Ivan Priezzhev, Houston, TX (US); Aaron Scollard, Houston, TX (US); Zhengang Lu, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 523 days.

(21) Appl. No.: 14/780,931

(22) PCT Filed: Mar. 26, 2014

(86) PCT No.: PCT/US2014/031802
§ 371 (c)(1),
(2) Date: Sep. 28, 2015

(87) PCT Pub. No.: WO2014/160741
PCT Pub. Date: Oct. 2, 2014

(65) Prior Publication Data
US 2016/0041302 A1 Feb. 11, 2016

Related U.S. Application Data

(60) Provisional application No. 61/805,545, filed on Mar. 27, 2013.

(51) Int. Cl.
*G01V 99/00* (2009.01)
*G06F 17/10* (2006.01)
(Continued)

(52) U.S. Cl.
CPC .............. *G01V 99/005* (2013.01); *E21B 7/04* (2013.01); *E21B 44/00* (2013.01); *E21B 47/022* (2013.01);
(Continued)

(58) Field of Classification Search
CPC .......... G01V 99/005; E21B 7/04; G06F 17/10
(Continued)

(56) References Cited

U.S. PATENT DOCUMENTS 5,703,773 A * 12/1997 Tabarovsky ............. G01V 3/28
702/11
5,812,068 A * 9/1998 Wisler .................... E21B 7/068
175/40
(Continued)

FOREIGN PATENT DOCUMENTS

EP 2450527 A1 3/2011

OTHER PUBLICATIONS

PCT/US2014/031802 International Search Report and Written Opinion dated Jul. 17, 2014, 13 pgs.

*Primary Examiner* — Kamini S Shah
*Assistant Examiner* — Iftekhar A Khan

(57) ABSTRACT

A method, apparatus, and computer-readable medium provide automatic geosteering by automatically updating a geosteering structure model based upon observed data gathered during a drilling operation. In some embodiments, automatic updates may be used to introduce vertical shifts into a geosteering structure model to match synthetic log data with observed log data. In addition, in some embodiments an evolutionary algorithm may be used to introduce such vertical shifts and thereby provide an optimal match between the synthetic and observed log data.

27 Claims, 12 Drawing Sheets

(51) Int. Cl.
  *G01V 3/18*    (2006.01)
  *E21B 44/00*   (2006.01)
  *E21B 47/024*  (2006.01)
  *E21B 7/04*    (2006.01)
  *E21B 47/022*  (2012.01)

(52) U.S. Cl.
  CPC .............. *E21B 47/024* (2013.01); *G01V 3/18* (2013.01); *G06F 17/10* (2013.01)

(58) Field of Classification Search
  USPC .......................................................... 703/2
  See application file for complete search history.

(56) References Cited

U.S. PATENT DOCUMENTS

| | | | | |
|---|---|---|---|---|
| 5,812,493 A * | 9/1998 | Robein | .................... | E21B 47/02 367/25 |
| 5,995,446 A * | 11/1999 | Meyer | .................... | G01V 1/42 367/25 |
| 6,196,335 B1 * | 3/2001 | Rodney | .................... | G01V 1/42 175/40 |
| 6,272,434 B1 * | 8/2001 | Wisler | .................... | E21B 7/068 702/11 |
| 6,654,691 B2 * | 11/2003 | Metrick | .................... | G01V 1/34 702/6 |
| 6,950,749 B2 * | 9/2005 | Frenkel | .................... | G01V 3/20 324/339 |
| 6,952,101 B2 * | 10/2005 | Gupta | .................... | E21B 47/02216 166/254.1 |
| 7,093,672 B2 * | 8/2006 | Seydoux | .................... | E21L 37/04 175/24 |
| 7,289,909 B2 * | 10/2007 | Thomann | .................... | G01V 1/50 702/6 |
| 7,359,844 B2 * | 4/2008 | Sung | .................... | E21B 49/00 324/339 |
| 7,587,373 B2 | 9/2009 | Smith, Jr. et al. | | |
| 7,596,481 B2 * | 9/2009 | Zamora | .................... | E21B 47/0002 702/18 |
| 7,958,949 B2 * | 6/2011 | Al Hadhrami | .................... | E21B 47/022 175/40 |
| 8,478,530 B2 * | 7/2013 | Rabinovich | .................... | G01V 3/28 702/7 |
| 8,736,270 B2 * | 5/2014 | Seydoux | .................... | G01V 3/28 324/323 |
| 8,798,974 B1 * | 8/2014 | Nunns | .................... | G01V 99/005 702/16 |
| 9,043,154 B2 * | 5/2015 | Luxey | .................... | E21B 44/00 324/303 |
| 9,841,527 B2 * | 12/2017 | Nikitenko | .................... | G01V 3/28 |
| 2003/0093223 A1 * | 5/2003 | Zhang | .................... | G01V 3/28 702/7 |
| 2004/0154831 A1 * | 8/2004 | Seydoux | .................... | E21B 7/04 175/24 |
| 2005/0171698 A1 * | 8/2005 | Sung | .................... | E21B 49/00 702/9 |
| 2005/0246297 A1 * | 11/2005 | Chen | .................... | G06N 3/086 706/15 |
| 2007/0095536 A1 * | 5/2007 | Vinegar | .................... | C10G 1/002 166/302 |
| 2007/0168133 A1 * | 7/2007 | Bennett | .................... | E21B 49/00 702/6 |
| 2008/0136419 A1 * | 6/2008 | Seydoux | .................... | G01V 3/28 324/333 |
| 2008/0195319 A1 * | 8/2008 | Wilkinson | .................... | E21B 49/00 702/6 |
| 2008/0208477 A1 * | 8/2008 | Kelfoun | .................... | E21B 7/046 702/11 |
| 2009/0089028 A1 * | 4/2009 | Sagert | .................... | E21B 47/00 703/6 |
| 2009/0151938 A1 * | 6/2009 | Conkle | .................... | E21B 47/00 166/254.1 |
| 2009/0157361 A1 * | 6/2009 | Toghi | .................... | E21B 7/04 703/3 |
| 2011/0191029 A1 * | 8/2011 | Jalali | .................... | E21B 49/087 702/6 |
| 2012/0046868 A1 * | 2/2012 | Tchakarov | .................... | E21L 37/04 702/9 |
| 2012/0147006 A1 | 6/2012 | Rothnemer | | |
| 2012/0188091 A1 * | 7/2012 | Calleja | .................... | G01V 3/38 340/854.1 |
| 2012/0222901 A1 * | 9/2012 | Pei | .................... | E21B 49/003 175/56 |
| 2013/0270011 A1 * | 10/2013 | Akkurt | .................... | E21B 49/088 175/58 |
| 2014/0000964 A1 * | 1/2014 | Selman | .................... | E21B 44/00 175/24 |
| 2015/0134255 A1 * | 5/2015 | Zhang | .................... | G01V 1/40 702/7 |
| 2015/0218888 A1 * | 8/2015 | Schonberger | .................... | E21B 7/04 175/24 |
| 2015/0292266 A1 * | 10/2015 | Johnson | .................... | E21B 7/04 175/24 |
| 2016/0069182 A1 * | 3/2016 | Neale | .................... | E21B 47/16 166/254.2 |

\* cited by examiner

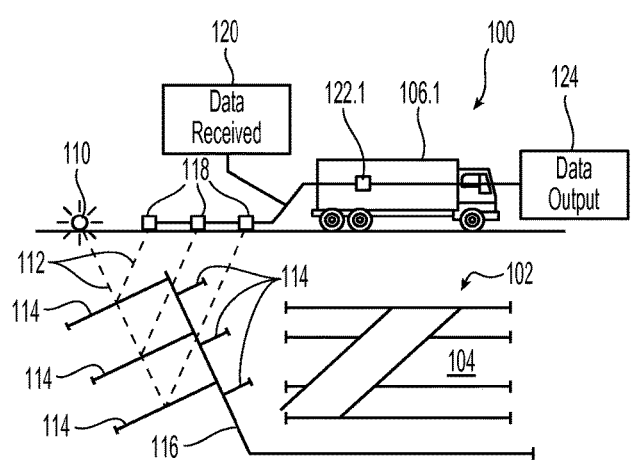
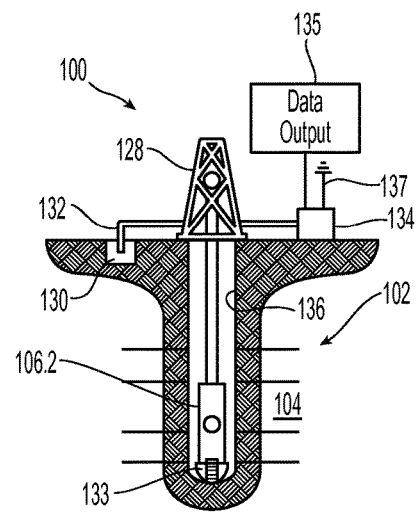
*Fig. 2A*  *Fig. 2B*
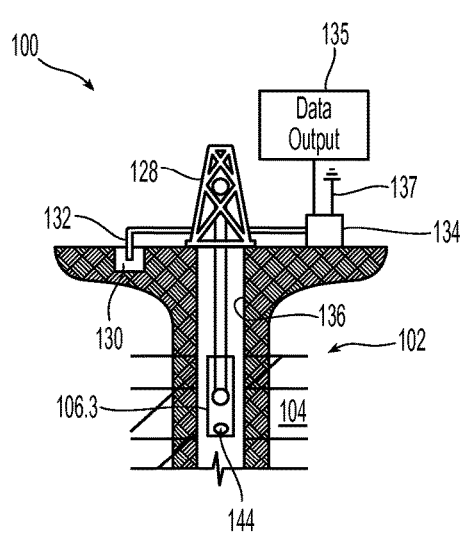
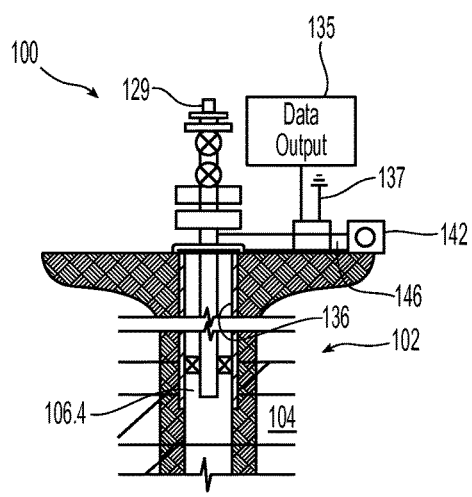
*Fig. 2C*  *Fig. 2D*

AUTOMATIC GEOSTEERING AND EVOLUTIONARY ALGORITHM FOR USE WITH SAME

BACKGROUND

Geosteering is a process used to manage the trajectory of a borehole based on geological information gathered during a drilling operation, and a goal may be to reach specific geological targets. With some geosteering operations, a well plan with an expected well path is developed, and while a borehole is being drilled according to the well plan, geological information is gathered so that the well plan can be revised as necessary to reach a desired geological target. The geological information may be gathered, for example, using mud logging, measurement while drilling (MWD), or logging while drilling (LWD).

Some conventional geosteering approaches rely on a geosteering structure model based on gamma ray (GR) or resistivity logs. In the case of a GR log model, the model may be initialized with flat layers with constant GR values, e.g., based on measurements taken from a pilot well GR log. Then, during drilling of the horizontal part of a wellbore, real time information, such as a measured GR log and real time formation telemetry data measurements, are collected from the well drilling tool.

As drilling progresses, geosteering software allows an operator to visualize differences between the structure model and the observed data, e.g., by comparing a synthetic GR log that is calculated from the structure model and the known well trajectory and current position, and a measured GR log calculated from the real time measurements. Based upon these differences, an operator may be permitted to manually modify the structure model to better match the synthetic and measured GR logs. Accordingly, geosteering can be a highly involved process and can be highly dependent upon the expertise and experience of the operator.

SUMMARY

The embodiments disclosed herein provide a method, apparatus, and program product that provide automatic geosteering by automatically updating a geosteering structure model based upon observed data gathered during a drilling operation. In some embodiments, automatic updates may be used to introduce vertical shifts into a geosteering structure model to match synthetic log data with observed log data. In addition, in some embodiments an evolutionary algorithm may be used to introduce such vertical shifts and thereby provide an optimal match between the synthetic and observed log data.

Therefore, consistent with an embodiment, automatic geosteering may be performed by generating synthetic log data from a geosteering structure model, and using at least one processor, automatically updating the geosteering structure model to match the synthetic log data with observed log data collected during a drilling operation.

This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF DRAWINGS

FIGS. 2A-2D illustrate simplified, schematic views of an oilfield having subterranean formations containing reservoirs therein in accordance with implementations of various technologies and techniques described herein.

DETAILED DESCRIPTION

Embodiments consistent with the present disclosure implement automatic geosteering that automatically updates a geosteering structure model based upon observed or measurement data gathered during a drilling operation. In some embodiments, an evolutionary algorithm is used to automatically update the geosteering structure model to match observed and synthetic logs, e.g., observed and synthetic gamma ray (GR) or resistivity logs. Updates to the geosteering structure model then allow for updates to be manually or automatically made to a vertical drilling angle used during a drilling operation in a horizontal well to fit well trajectory with a target layer, or geological target.

Some embodiments attempt to identify vertical shifts of a geosteering structure model in a defined window proximate the bottom of a drilled horizontal well to match a synthetic GR or resistivity log or curve to observed GR or resistivity log or curve over this window. In some embodiments, an evolutionary algorithm may be used to identify vertical shifts in the defined window based on an iterative creation of sets (generation) of the separate solutions of the vertical shifts with selection of a solution based upon calculation for every solution objective function (fitness function), e.g., a minimum square function to measure closeness of observed and synthetic GR logs. Also, in some embodiments, a fitness function such as a sum of square vertical shifts may be used to find a smoothed version of the solution. Also, in some embodiments horizontal variance of the vertical shifts may be used for evolutionary matching because in some instances it may be more natural to find parameters close to structure angles.

Other variations and modifications will be apparent to one of ordinary skill in the art.

Hardware and Software Environment

Figure 1:
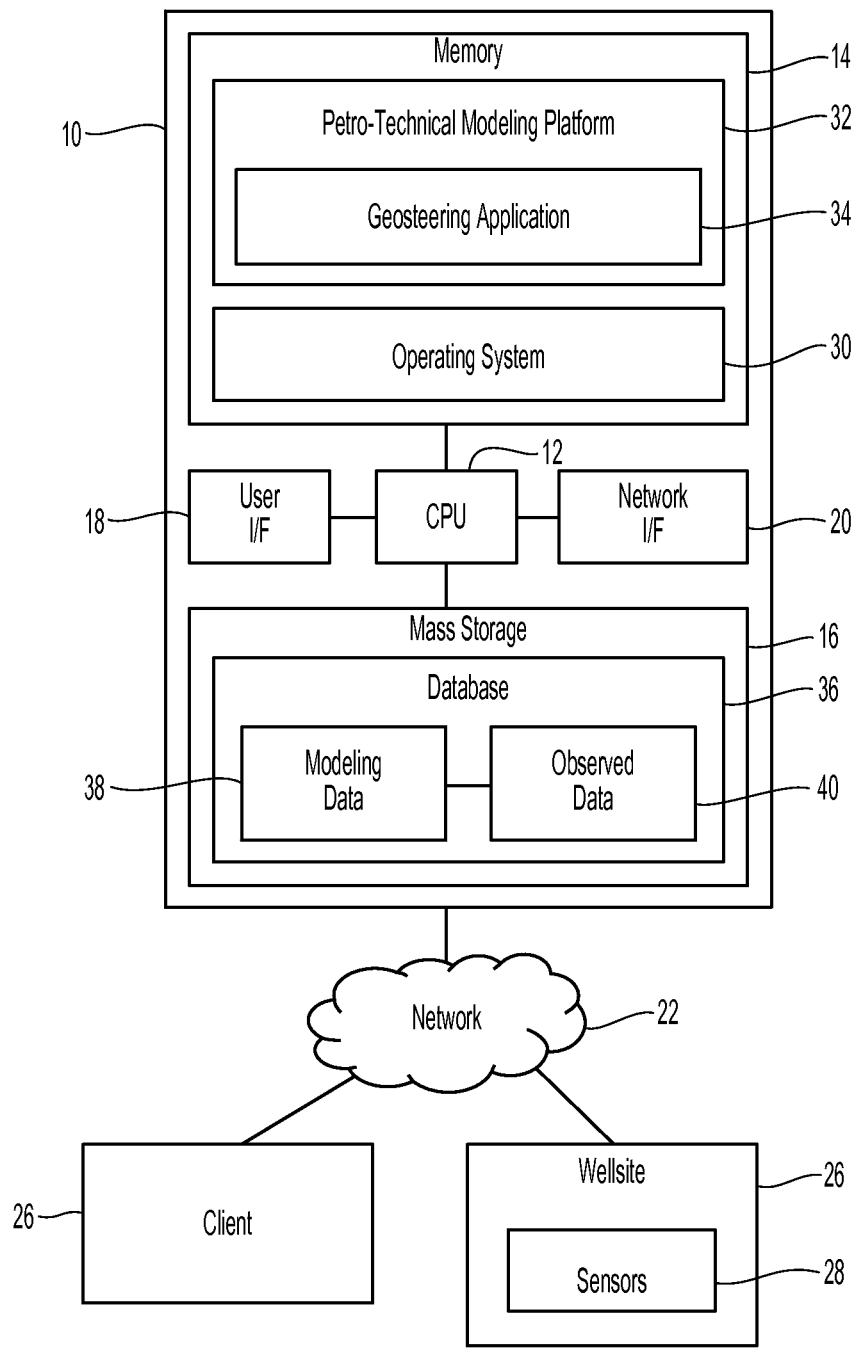
FIG. 1 is a block diagram of an example hardware and software environment for a data processing system in accordance with implementation of various technologies and techniques described herein.

Turning now to the drawings, FIG. 1 illustrates an example data processing system 10 in which the various technologies and techniques described herein may be implemented. System 10 is illustrated as a modeling system including one or more computers, each including a central processing unit 12 including at least one hardware-based microprocessor coupled to a memory 14, which may represent the random access memory (RAM) devices comprising the main storage of a computer, as well as any supplemental levels of memory, e.g., cache memories, non-volatile or backup memories (e.g., programmable or flash memories), read-only memories, etc. In addition, memory 14 may be considered to include memory storage physically located elsewhere in a computer, e.g., any cache memory in a microprocessor, as well as any storage capacity used as a virtual memory, e.g., as stored on a mass storage device 16 or on another computer or networked storage device. System 10 may be incorporated into a clustering environment and implemented on a plurality of computer nodes, or may reside in one or more virtual machines executing in one or more physical machines.

System 10 also receives a number of inputs and outputs for communicating information externally. For interface with a user or operator, system 10 includes a user interface 18 incorporating one or more user input devices, e.g., a keyboard, a pointing device, a display, a printer, etc. Otherwise, user input may be received, e.g., over a network interface 20 coupled to a network 22, from one or more client computers 24, as well as from one or more wellsites 26, each of which may include one or more sensors 28. System 10 also may be in communication with one or more mass storage devices 16, which may be, for example, internal hard disk storage devices, external hard disk storage devices, storage area network devices, etc.

The system 10 operates under the control of an operating system 30 and executes or otherwise relies upon various computer software applications, components, programs, objects, modules, data structures, etc. For example, a petro-technical modeling platform 32 may include a geosteering application 34, and rely on a database 36 within which is stored information including modeling data 38 and observed data 40.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code comprises one or more instructions that are resident at various times in various memory and storage devices in a computer, and that, when read and executed by one or more processors in a computer, cause that computer to perform the steps necessary to execute steps or elements embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is usually filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
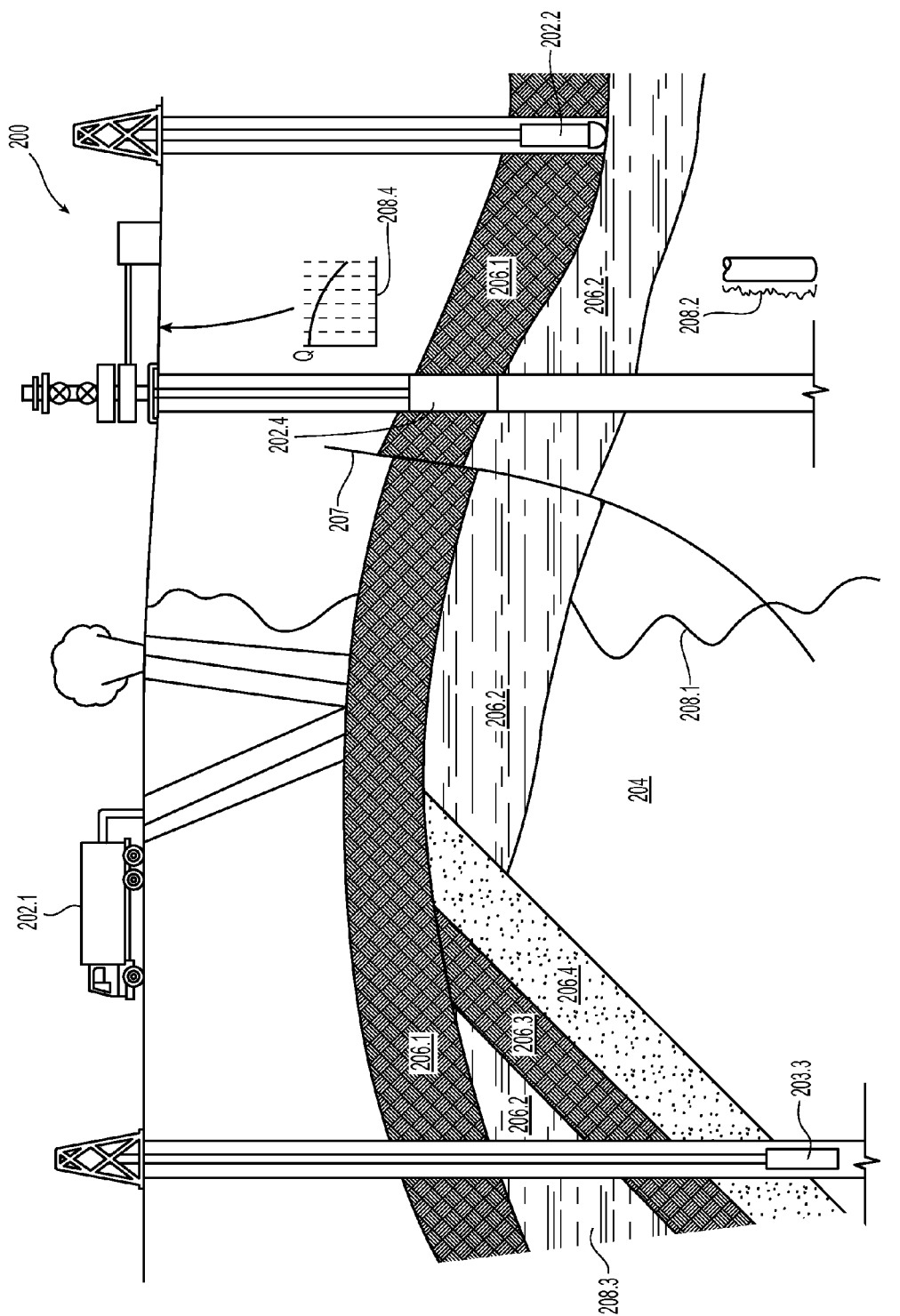
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that provides a resistivity or other measurement of the formation at various depths.

A production decline curve or graph 208.4 is a dynamic data plot of the fluid flow rate over time. The production decline curve provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, e.g., below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 may be used by a geophysicist to determine characteristics of the subterranean formations and features. The core data shown in static plot 208.2 and/or log data from well log 208.3 are used by a geologist to determine various characteristics of the subterranean formation. The production data from graph 208.4 is used by the reservoir engineer to determine fluid flow reservoir characteristics. The data analyzed by the geologist, geophysicist and the reservoir engineer may be analyzed using modeling techniques.

Figure 4:
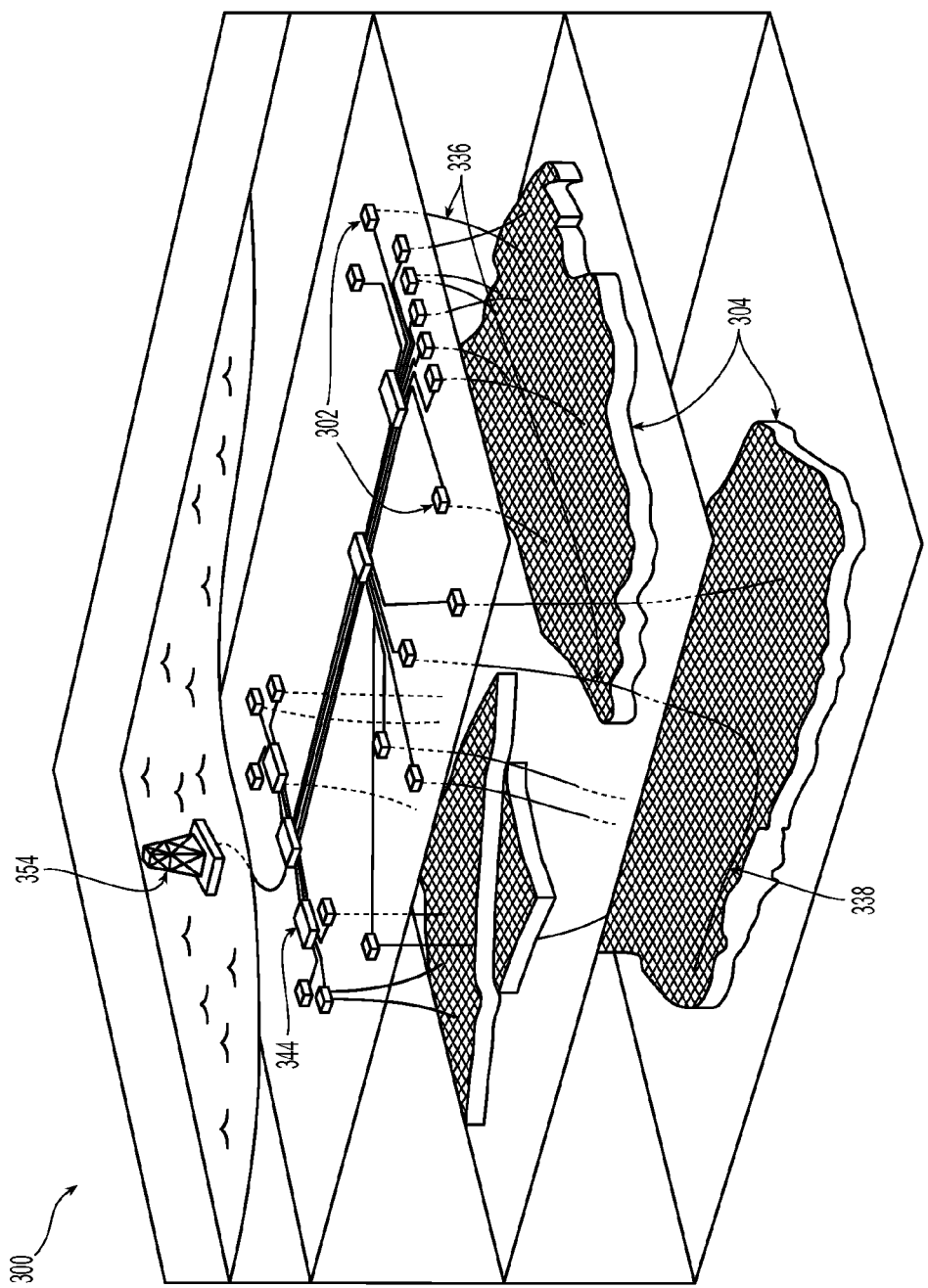
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part of or the entire oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores 336 extend through subterranean formations 306 including reservoirs 304. These reservoirs 304 contain fluids, such as hydrocarbons. It will be appreciated that horizontal drilling may be used for some of the wellbores, e.g., as shown by horizontal wellbore 338 in FIG. 4. The wellsites draw fluid from the reservoirs and pass them to the processing facilities via surface networks 344. The surface networks 344 have tubing and control mechanisms for controlling the flow of fluids from the wellsite to processing facility 354.

Automatic Geosteering

Geosteering is a process used to manage the trajectory of a borehole based on geological information gathered during a drilling operation, and a goal may include reaching specific geological targets. According to an embodiment, geosteering software used for this process may have one or more of the following characteristics: (1) visualization is based on a two dimensional (2D) cross section along a well trajectory projection to surface; (2) gamma ray (GR) logs are used; (3) a geosteering structure and synthetic GR model may be created with initial layers (e.g., flat layers) having constant GR values based on a pilot well GR log; (4) during drilling of a horizontal part of a wellbore, real time information about the trajectory and measured GR log, e.g., real time formation telemetry data measurements, may be obtained from a well drilling tool; (5) a synthetic GR log is calculated via the well trajectory and current position of the GR model; (6) the geosteering software may allow an operator to interactively and/or manually change the dip of the structure model to match the measured and synthetic logs; (7) the geosteering software may allow the operator to perform matching using vertical shifts of the structure model in a defined position to model structural faults; and (8) the geosteering software may allow an operator to visually match the observed and synthetic logs on 2D cross sections. With respect to (3), besides flat initial layers, other shapes or configurations of the layers can be used, such as a dipped layer structure using log data from one or two offset wells. In an example embodiment, the system can also create the initial model using regional structure surfaces, when they are available. An example advantage of an example embodiment that uses regional structure surfaces may be that the initial model will be closer to the actual structure than models with flat layers Visually matching observed and synthetic logs, and manually changing a geosteering structure model can involve the efforts of an experienced operator. Embodiments consistent with the present disclosure, may employ an automatic geosteering process to automate, guide, and/or otherwise manage the updating of a geosteering structure model based upon observed data generated in the course of a drilling operation. A geosteering structure model may be dynamically updated based upon an algorithm that matches a synthetic log, e.g., a synthetic GR log, to a corresponding observed log, e.g., an observed GR log as new data is collected. In some embodiments, an evolutionary algorithm may be used for matching over the new data. In addition, as will become more apparent below, a more continuous result may be obtained in some embodiments by matching previous portions of data according predefined parameters.

Returning to FIG. 1, a geosteering application 34 incorporating the herein-described functionality may be implemented within a petro-technical modeling platform 32, or may be implemented separately therefrom. A geosteering structure model and associated synthetic logs (e.g., GR, resistivity or other logs) may be defined and stored as modeling data 38 along with observed logs, telemetry data and other observed data 40 in a database 36 that is either integrated into system 10 or accessible thereto over a network. The observed data 40 may be collected from one or more sensors 28 at one or more wellsites, e.g., sensors used for mud logging, measurement while drilling (MWD) or logging while drilling (LWD). According to an embodiment, an updated well plan, revised based upon an updated geosteering structure model, may be communicated back to an appropriate well site and used to control the trajectory of a drilling operation.

Figure 5:
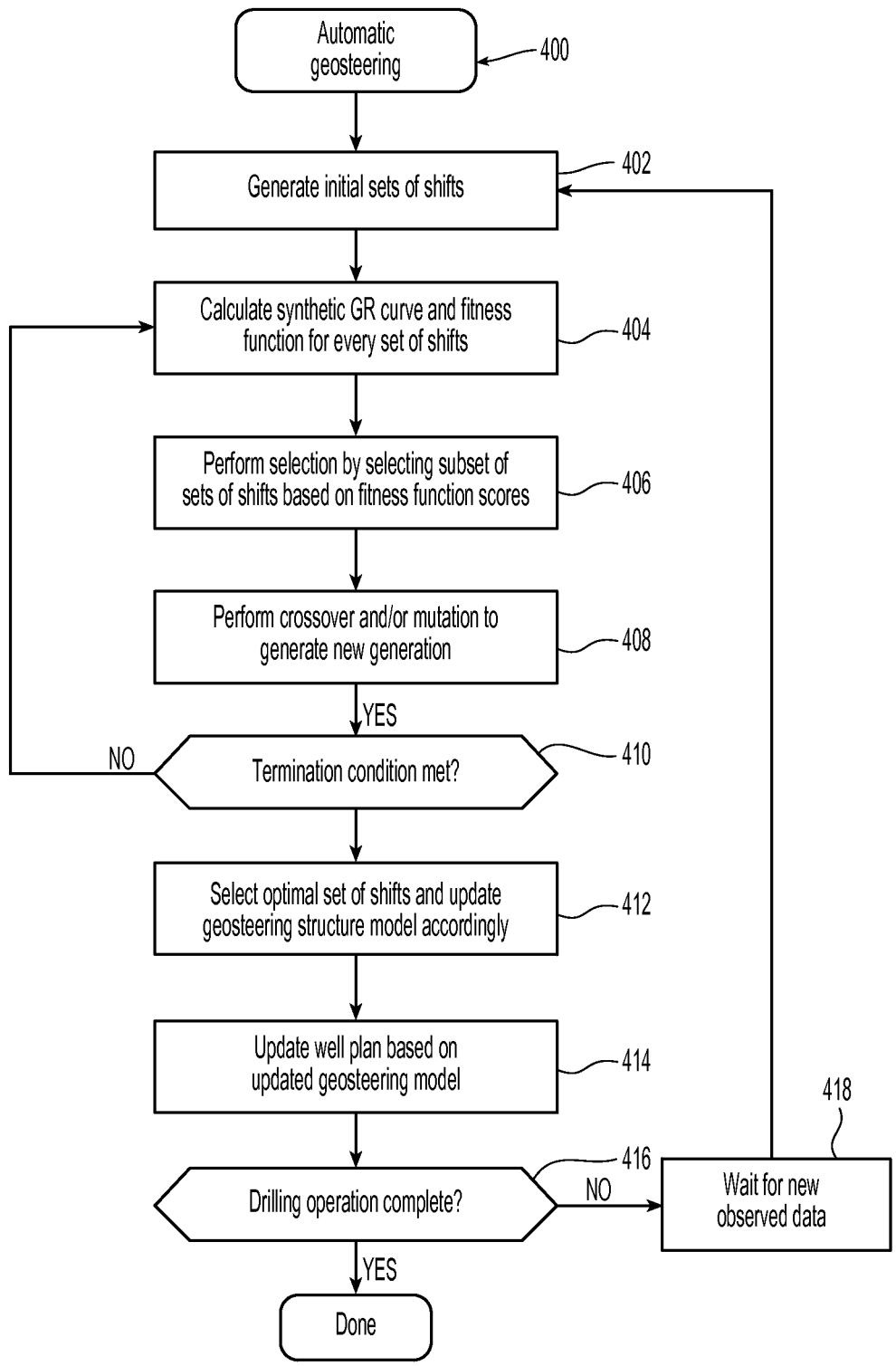
FIG. 5 is a flowchart illustrating an example sequence of operations used to perform automatic geosteering in the system of FIG. 1.

FIG. 5 illustrates at 400 an example of operations for an evolutionary algorithm implemented by, accessed by, and/or interfaced to geosteering application 34 to perform automated updates to a geosteering structure model to create a better match or correspondence between synthetic and observed logs, which may include GR logs. In an example embodiment, multiple iterations can be run based on different scenarios to find a selected, threshold, best, and/or most closely-matched fit between synthetic and observed logs using one or more evolutionary or genetic operations, such as crossover and/or mutation operations. An evolutionary operation or process can, in some embodiments, be applied for each of a series of iterations or generations.

Starting in block 402, a plurality of sets of initial shift combinations, or sets of shifts, for the geosteering structural model can be generated. In embodiments, the shifts can be or include a set of vertical shifts of the geological structures represented by the model. In embodiments, the shifts can be based on a random function within a maximum possible shift, thereby creating an initial generation of candidate solutions. In addition, in some embodiments, a range of horizontal variance of vertical shifts can be used in addition to or instead of the vertical shifts themselves, since it has been observed that the use of horizontal variances can be useful in identifying parameters close to structure angles, under some circumstances. It will be appreciated that while the use of absolute vertical shifts and/or variances in vertical shifts are noted, other values, including other perturbations or variations in the underlying geological structures of the model, can be used.

In block 404, a synthetic GR curve can be calculated for every set of vertical shifts, as well as a corresponding fitness function that is used to "score" the associated set of shifts. For example, a fitness function such as a minimum or least-squares function, and/or other objective function or measure, may be used to quantify or measure the closeness, correspondence, degree of matching, and/or similarity of the observed and synthetic GR logs together with a square function of the vertical shifts. In some embodiments, an additional function may be added to the fitness function with a predefined coefficient alpha to generate smoothed variants of the vertical shifts. While the generation of a synthetic GR curve is noted, it will likewise be appreciated that other curves, graphs, and/or types of probes or signals can be used, such as resistivity curves, logs, or functions.

In block 406, selection of candidate solutions for the next evolutionary generation can be selected or identified by selecting a subset of the sets of shifts to the geosteering structural model which produce the best, closest, and/or otherwise qualified or selected matches or correspondence, based upon the fitness function scores and/or metrics.

Figure 6:
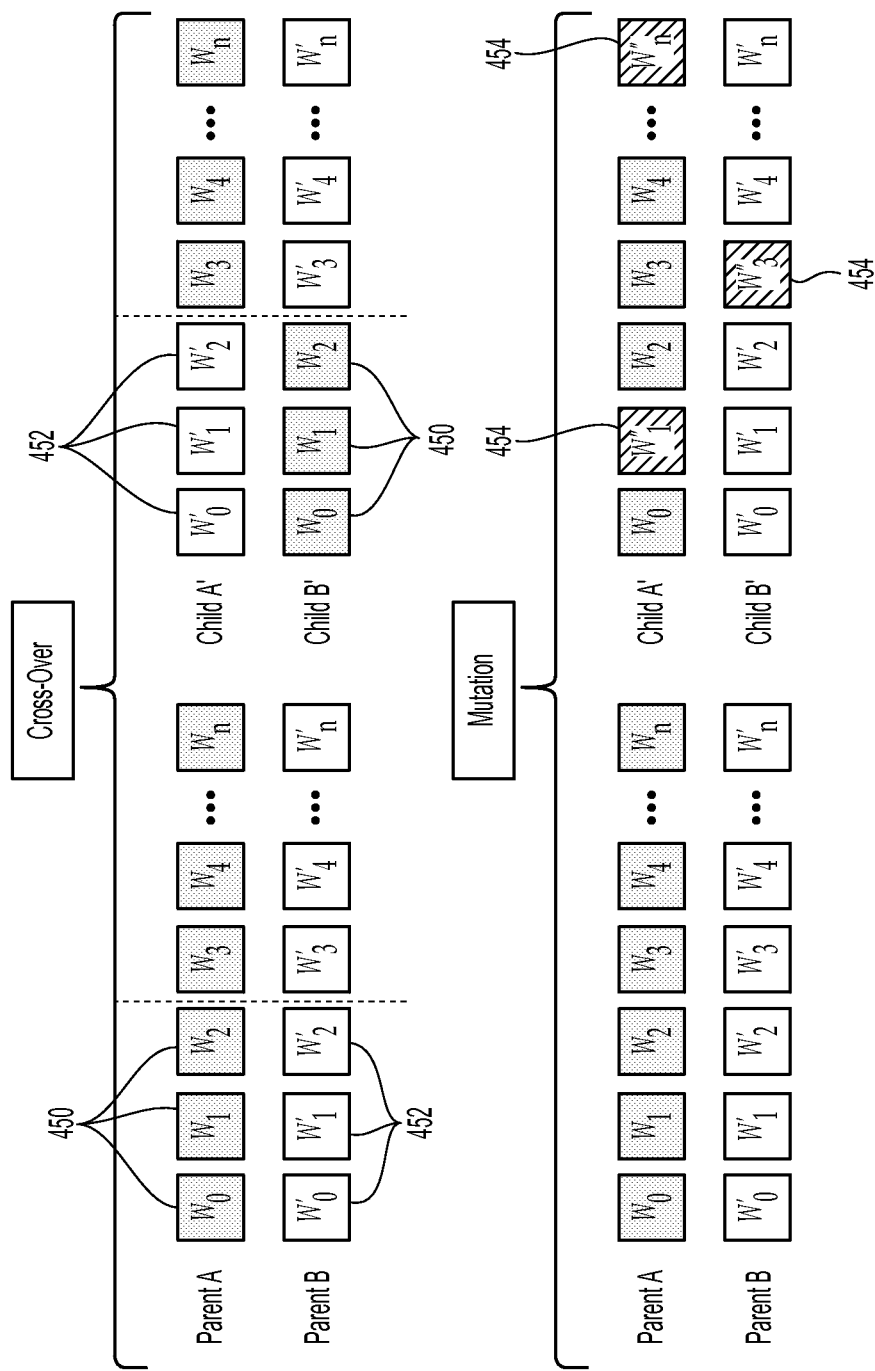
FIG. 6 is a block diagram illustrating crossover and mutation genetic operations used in the sequence of operations of FIG. 5.

In block 408, one or more evolutionary algorithms or operations, e.g., genetic operations, can be performed to "breed" or evolve the candidate solutions. Those evolutionary (or genetic) algorithms can be or include crossover and/or mutation operations. For instance, as shown in FIG. 6, a crossover of shifts 450, 452 between parents A/B and children A'/B' may be performed to exchange shift values between sets of shifts. Analogizing a set of shifts as a chromosome and a shift within a set of shifts as a gene on a chromosome, a crossover operation can exchange genes (i.e., shifts) between chromosomes (i.e., groups or sets of shifts). The number of genes exchanged may be singular or multiple, and may occur with a given or differing probability within and/or after each iteration.

In addition, as also shown by shifts 454 in FIG. 6, a mutation operation may also be performed, in addition to or instead of a crossover operation. As with biological evolution theory, genes can replaced randomly within chromosomes in successive generations. The effects of those random substitutions can in general include a reduction of the likelihood that the process will converge to a local minimum. This can be advantageous because an evolutionary history which has converged to a local minimum may become fixed or "stuck" at that value for the subject gene/chromosome value, while a better global minimum value may exist outside of that value in the gene/chromosome.

The probability of occurrence of a mutation, crossover, and/or other genetic or other evolutionary can be configured to be a function of the iteration (or generation) step itself. Thus, for instance, a mutation can be configured to be more likely to happen as soon as the evolution of the fitness function is reaching a plateau, minimum, and/or other point, event, or condition. In some embodiments, the mutation probability may be configured to be lower (e.g., significantly lower) than the cross-over probability, but other relationships between the likelihood of mutation and cross-over can be used.

While mutation and cross-over events are described, other evolutionary/genetic operations or processes, and/or complementary or additional algorithms or processing, can be used. This can include events, algorithms, and/or processes such as re-grouping, colonization-extinction, migration, and others. For instance, Gaussian adaptation, simulated annealing, diversity algorithms or techniques, and/or other algorithms or techniques can also be used to adjust the results of the genetic operations themselves.

In an example embodiment, it may also be desirable in block 408 to maintain the population of candidate solutions (sets of shifts/variances) relatively constant from generation to generation (e.g., at 50 candidates). In such an embodiment, even as selection is reducing the number of the population (e.g., by taking the 10 candidates with the best fitness function scores), applying crossover and mutation to those selected candidates may be used to regenerate a full set of 50 "chromosomes" in the population, which may in cases avoid convergence to a local minimum or other best outcome which does not represent the global minimum or other best outcome.

Block 410 determines whether a termination condition is met, e.g., whether a selected or predetermined (N) iterations have occurred, whether a candidate solution has produced a fitness function above or below a predetermined threshold, or some other measure, condition, and/or indicator that the evolutionary processing has converged on a suitable solution. If not, control returns to block 404 to process a new generation of variations and solutions. Otherwise, control passes to block 412 to select an optimal or best-available set of shifts/variances, and/or otherwise select a set of shifts/variances, and update the geosteering structure model accordingly. Block 414 can then update the associated well plan based on the updated geological model upon which the geosteering operations are based.

In block 416, as long as the drilling operation is not yet complete, control passes to block 418 to wait for additional observed data to be obtained (e.g., after further drilling has been performed, and new GR and/or other log data has been retrieved). Once new data is obtained, control returns to block 402 to perform the various evolutionary algorithms and techniques again, based on the newly acquired or accessed data. Once the overall drilling operation is complete or at other times, the sequence of operations 400 can be rendered complete.

Figure 7:
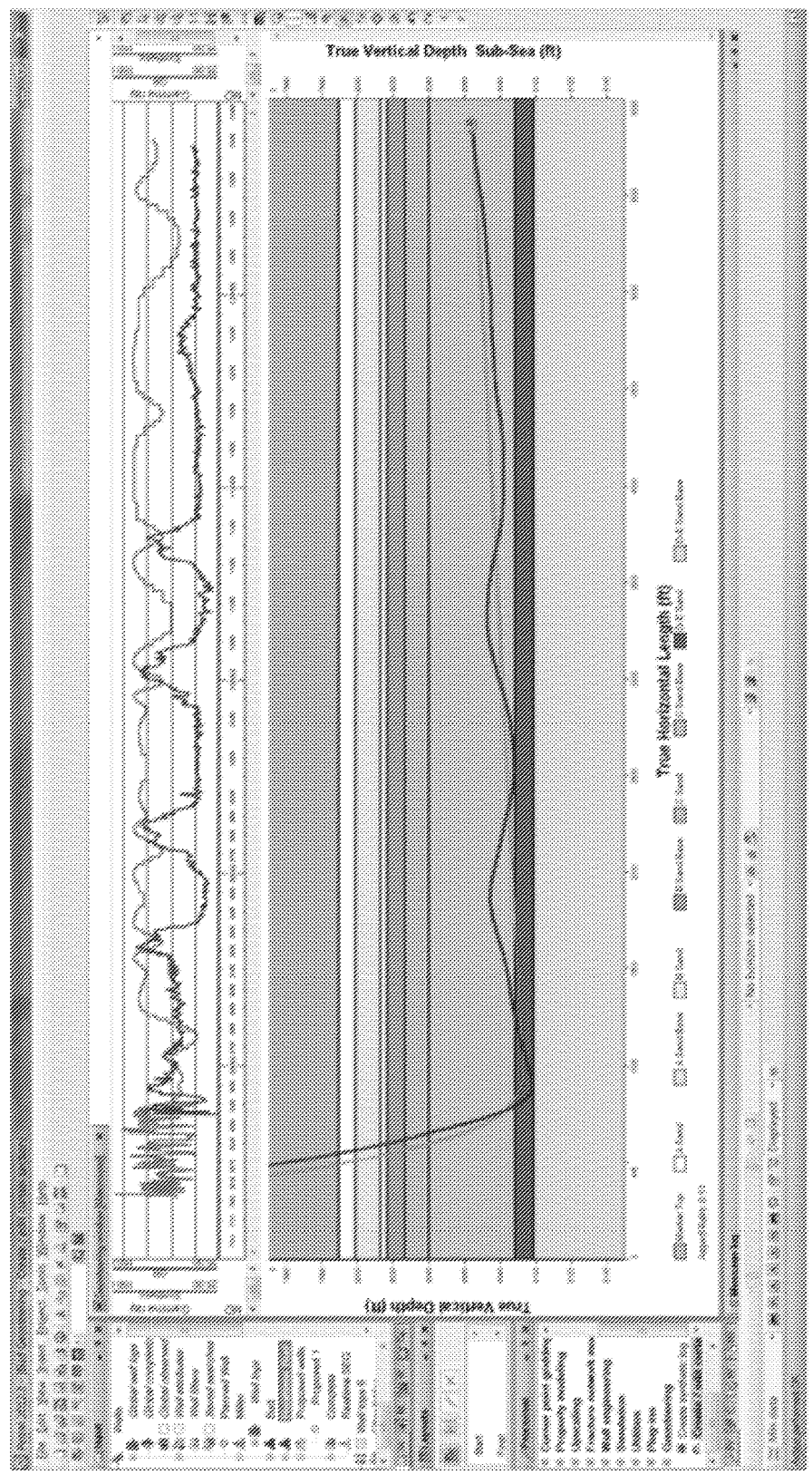
FIGS. 7 and 8 are graphs of an initial well section, projected well trajectory and initial geosteering structure model based on pilot well data and pilot well GR logs, respectively.
Figure 8:
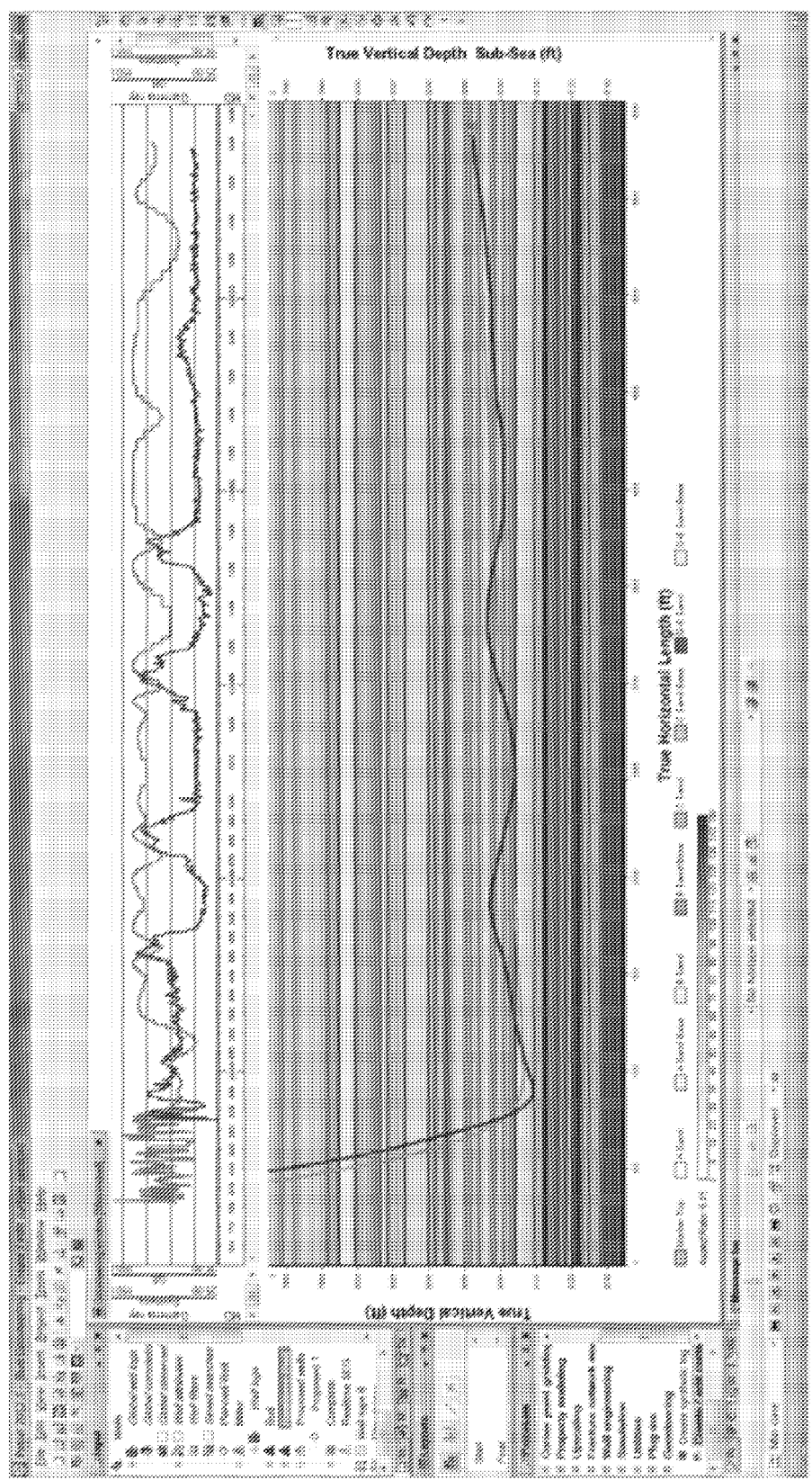
Figure 9:
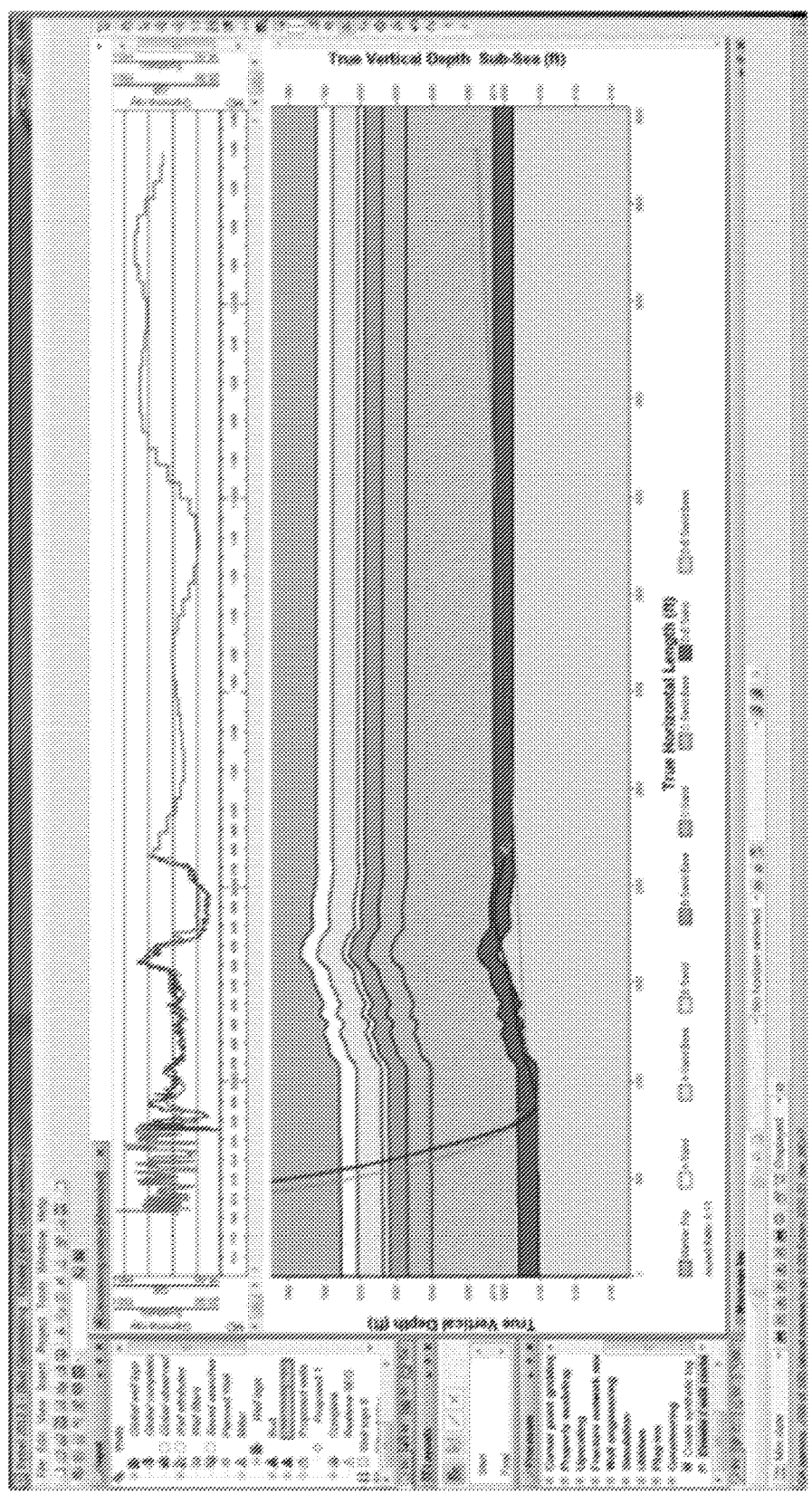
FIGS. 9-12 are graphs of automatic updates to the initial geosteering structure model and projected trajectory during intermediate (FIGS. 9-11) and final (FIG. 12) stages of a drilling operation, and utilizing the sequence of operations of FIG. 5.
Figure 10:
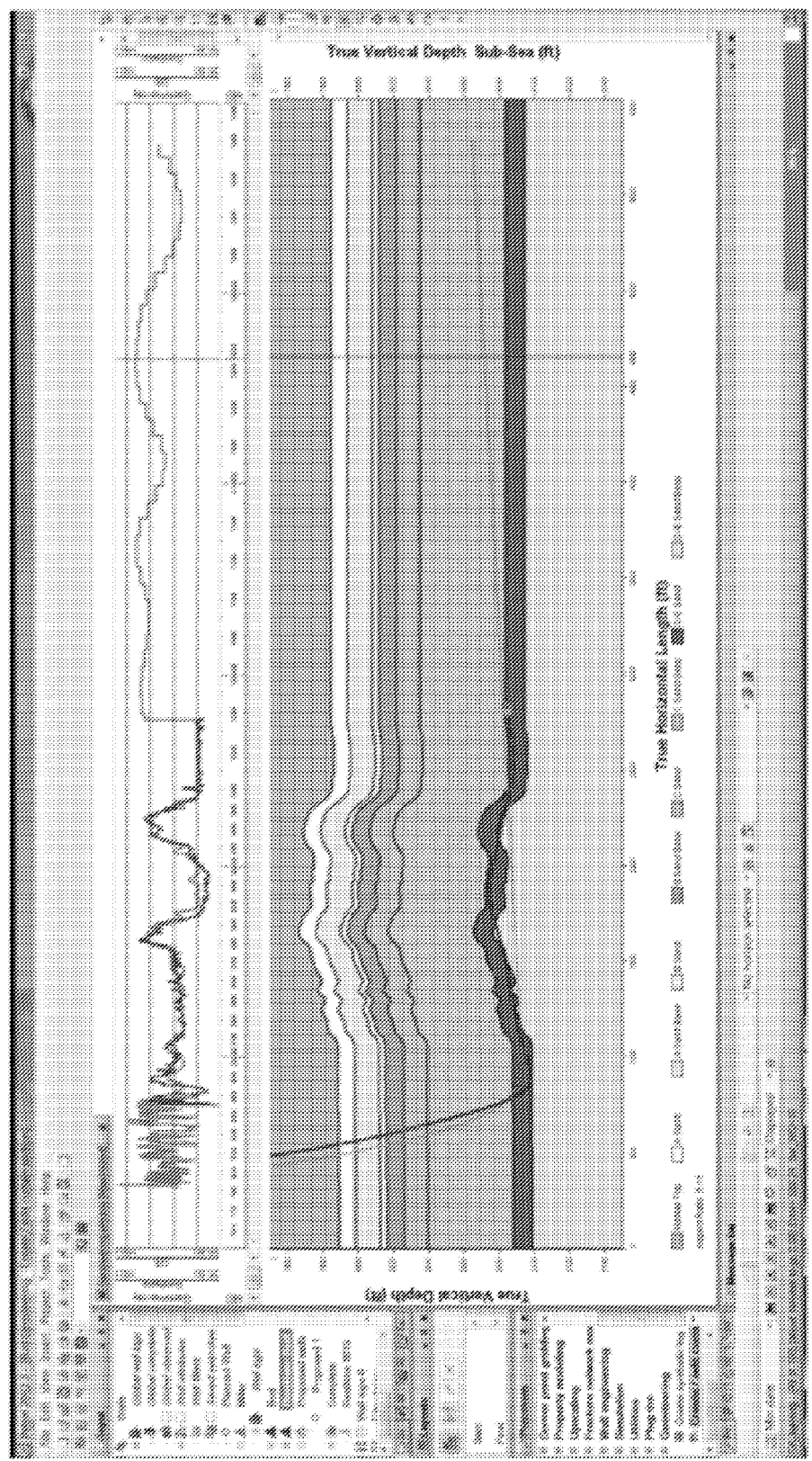
Figure 11:
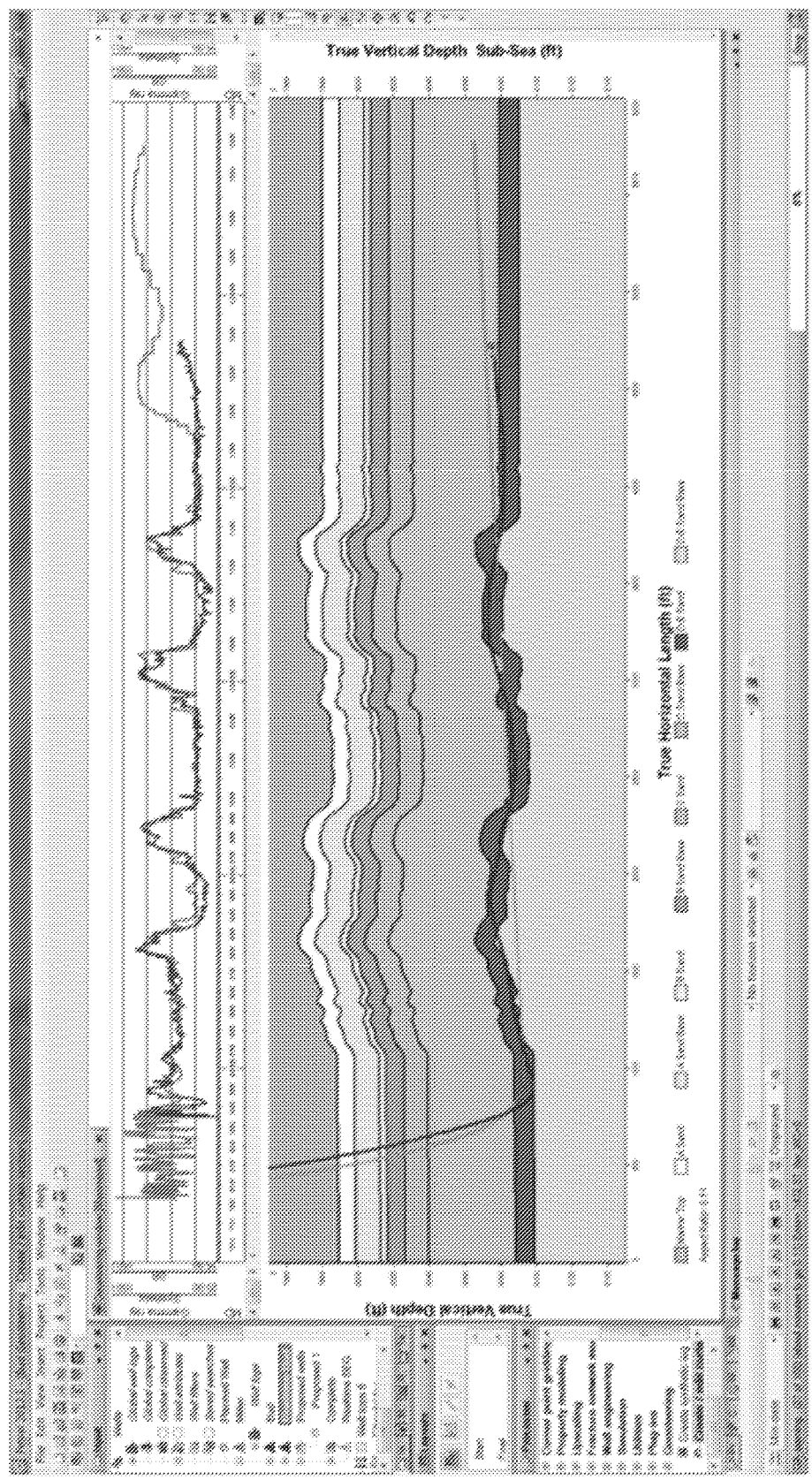
Figure 12:
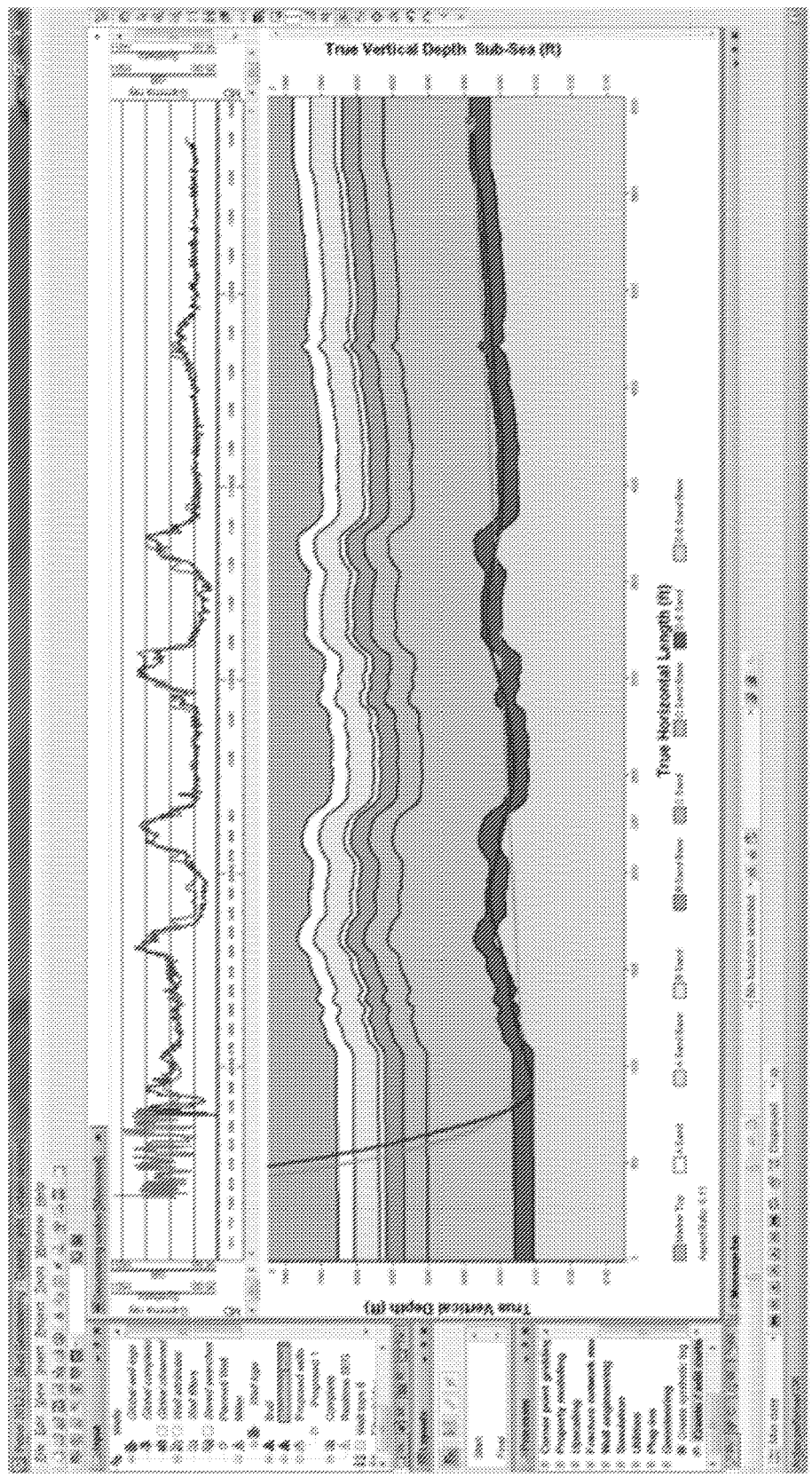

As a representative example, FIGS. 7 and 8 illustrate an initial well section with a projected well trajectory and initial geosteering structure model that is initially created with simple horizontal layers based on pilot well data. FIG. 7, in particular, illustrates a well section and synthetic log (upper curve) with a projected horizontal well and an initial structure of the layers as created based on pilot well data. FIG. 8 illustrates a well section and synthetic log (upper curve) with a projected horizontal well and GR model based on a pilot well GR log.

FIGS. 9, 10, 11, and 12 illustrate the well section at different points in a drilling operation based upon gathered real time data, and the changes to the geosteering structure model as a result of the herein-described evolutionary algorithms and techniques to obtain desired or selected matching between the synthetic and observed GR logs. The upper horizontal track in each figure illustrates the degree of correspondence between the synthetic and observed GR logs.

It may be noted that any intermediate results (FIGS. 9-11), or the final result (FIG. 12), can in example embodiments be manually edited to explore or obtain better or different correspondence between the synthetic and observed data logs. During manual editing, it may also be possible to smooth the geological structure, change the structure angle, add vertical or non-vertical faults or blocks of faults, and/or provide other updates to better match the observed results with the geological model.

While illustrated embodiments utilize GR logs, it will again be appreciated that other embodiments may use resistivity or other data, signal, probes, or logs, such as optical, acoustical, and other data. Also, embodiments can be based on or utilize multiple logs (i.e., multi-logs) captured over different positions, at certain times (e.g., different times), using certain types of observed data signals (e.g., different types), and/or data logs otherwise encoding multiple data sets.

While various particular embodiments have been described, it will be understood that the invention is not intended to be limited thereto. In addition, it will be appreciated that implementation of one or more aspects of the aforementioned functionality, techniques, algorithms, and processes in software and thusly in a computer system executing such software would be within the abilities of one of ordinary skill, in the art having the benefit of the instant disclosure.

Yet other modifications could accordingly be made without deviating from its spirit and scope as claimed.

What is claimed is:
1. A method, comprising:
   accessing synthetic log data based on a model of a geological formation;
   accessing observed log data collected from a drilling operation in the geological formation;
   iterating, using one or more processors, an evolutionary algorithm to update a geosteering structure model, each iteration including:
      generating a plurality of updated models based on a set of shifts of geological structures represented by the geosteering structure model, the set of shifts including at least one of a vertical shift, or a variance of a vertical shift of geological structures represented by the geosteering structure model;
      generating updated synthetic log data using at least one of the updated models; and
      selecting a candidate solution from the plurality of updated models for a next evolutionary generation based on a comparison of the observed log data and the updated synthetic log data; and
   updating a well plan for a drilling operation based upon the candidate solution of a last iteration of the evolutionary algorithm.

2. The method of claim 1, wherein the evolutionary algorithm comprises performing at least one of a crossover operation or a mutation operation.

3. The method of claim 1, wherein the selecting the candidate solution comprises selecting an updated model for which the comparison produces a fitness function measure between the observed data log and the updated synthetic log data.

4. The method of claim 1, wherein the synthetic log data comprises at least one of:
a synthetic gamma ray (GR) log, or
a synthetic resistivity log.

5. The method of claim 1, wherein the observed log data comprises at least one of:
an observed gamma ray (GR) log, or
an observed resistivity log.

6. The method of claim 1, wherein the iterating the evolutionary algorithm comprises a plurality of generations of updated models each based on an updated data log.

7. A system, comprising:
one or more processors; and
a memory comprising one or more computer-readable media storing synthetic log data based on a model of a geological formation, observed log data collected from a drilling operation in the geological formation, and instructions that, when executed by at least one of the one or more processors, cause the system to perform operations, the operations comprising:
iterating an evolutionary algorithm to update a geosteering structure model, each iteration including:
generating a plurality of updated models based on a set of shifts of geological structures represented by the geosteering structure model, the set of shifts including at least one of a vertical shift, or a variance of a vertical shift of geological structures represented by the geosteering structure model;
generating updated synthetic log data using at least one of the plurality of updated models; and
selecting a candidate solution from the plurality of updated models for a next evolutionary generation based on a comparison of the observed log data, and the updated synthetic log data; and
updating a well plan for a drilling operation based upon the candidate solution of a last iteration of the evolutionary algorithm.

8. The system of claim 7, wherein the evolutionary algorithm comprises performing at least one of a crossover operation or a mutation operation.

9. The system of claim 7, wherein the selecting the candidate solution comprises selecting an updated model for which the comparison produces a fitness function measure between the observed data log and the updated synthetic log data.

10. The system of claim 7, wherein the synthetic log data comprises at least one of:
a synthetic gamma ray (GR) log, or
a synthetic resistivity log.

11. The system of claim 7, wherein the observed log data comprises at least one of:
an observed gamma ray (GR) log, or
an observed resistivity log.

12. The system of claim 7, wherein the iterating the evolutionary algorithm comprises a plurality of generations of updated models each based on an updated data log.

13. A non-transitory computer-readable medium storing instructions that, when executed, cause a processor system to perform operations, the operations comprising:
accessing synthetic log data based on a model of a geological formation;
accessing observed log data collected from a drilling operation in the geological formation;
iterating an evolutional algorithm to update a geosteering structure model, each iteration including:
generating a plurality of updated models based on a set of shifts of geological structures represented by the geosteering structure model, the set of shifts including at least one of a vertical shift, or a variance of a vertical shift of geological structures represented by the geosteering structure model;
generating updated synthetic log data using at least one of the plurality of updated models;
selecting a candidate solution from the plurality of updated models for a next evolutionary generation based on a comparison of the observed log data and the updated synthetic log data; and
updating a well plan for a drilling operation based upon the candidate solution of a last iteration of the evolutionary algorithm.

14. The medium of claim 13, wherein the evolutionary algorithm comprises performing at least one of a crossover operation or a mutation operation.

15. The medium of claim 13, wherein the selecting the candidate solution comprises selecting an updated model for which the comparison produces a fitness function measure between the observed data log and each of the updated synthetic log data.

16. The medium of claim 13, wherein:
the synthetic log data comprises at least one of a synthetic gamma ray (GR) log, or a synthetic resistivity log; and
the observed log data comprises at least one of an observed gamma ray (GR) log, or an observed resistivity log.

17. The medium of claim 13, wherein the iterating the evolutionary algorithm comprises a plurality of generations of updated models each based on an updated data log.

18. The method of any of claims 3-6, wherein the evolutionary algorithm comprises performing at least one of a crossover operation or a mutation operation.

19. The method of any of claims 2 and 4-6, wherein the selecting the candidate solution comprises selecting an updated model for which the comparison produces a fitness function measure between the observed data log and the updated synthetic log data.

20. The method of any of claims 2, 3, 5, and 6, wherein the synthetic log data comprises at least one of:
a synthetic gamma ray (GR) log, or
a synthetic resistivity log.

21. The method of any of claims 2, 3, 4, and 6, wherein the observed log data comprises at least one of:
an observed gamma ray (GR) log, or
an observed resistivity log.

22. The system of any of claims 9-12, wherein generating the plurality of updated models using the evolutionary algorithm comprises performing at least one of a crossover operation or a mutation operation.

23. The system of any of claims 8 and 10-12, wherein the selecting the candidate solution comprises selecting an updated model for which the comparison produces a fitness function measure between the observed data log and the updated synthetic log data.

24. The system of any of claims 8, 9, 11 and 12, wherein the synthetic log data comprises at least one of:
   a synthetic gamma ray (GR) log, or
   a synthetic resistivity log; and
the observed log data comprises at least one of:
   an observed gamma ray (GR) log, or
   an observed resistivity log.

25. The medium of any of claims 15-17, wherein the evolutionary algorithm comprises performing at least one of a crossover operation or a mutation operation.

26. The medium of any of claims 14, 16 and 17, wherein the selecting the candidate solution comprises selecting an updated model for which the comparison produces a fitness function measure between the observed data log and each of the updated synthetic log data.

27. The medium of any of claims 14, 15 and 17, wherein:
   the synthetic log data comprises at least one of a synthetic gamma ray (GR) log, or a synthetic resistivity log; and
   the observed log data comprises at least one of an observed gamma ray (GR) log, or an observed resistivity log.

* * * * *